United States Patent [19]

Jacobs et al.

[11] Patent Number: 4,609,050

[45] Date of Patent: Sep. 2, 1986

[54] ROOT AND ROCK PICKER

[76] Inventors: Maurice A. Jacobs, Box 68, Sylvania, Saskatchewan, Canada, S0E 1S0; Alvin L. Woznikoski, Box 602, Tisdale, Saskatchewan, Canada, S0E 1D0

[21] Appl. No.: 700,005

[22] Filed: Feb. 8, 1985

[30] Foreign Application Priority Data

Feb. 24, 1984 [CA] Canada .................................. 448261

[51] Int. Cl.$^4$ ...................... A01B 43/00; A01D 25/04
[52] U.S. Cl. ........................................ 171/65; 171/82; 171/88; 171/98; 171/101; 56/328 R
[58] Field of Search ...................... 171/13, 28, 57, 58, 171/60, 61, 82, 63–65, 84–86, 88, 89, 103, 104, 114, 116, 117–120, 124, 125, 133, 101, 136, 98; 56/328 R; 172/32, 33

[56] References Cited

U.S. PATENT DOCUMENTS

| 47,566 | 5/1965 | Quimby | 171/63 |
|---|---|---|---|
| 491,984 | 2/1893 | Clark | 171/85 |
| 1,454,668 | 5/1923 | Bugla | 171/63 |
| 1,478,142 | 12/1923 | Ortmann | 171/101 |
| 1,747,139 | 2/1930 | Mourar | 171/85 |
| 1,808,928 | 6/1931 | Lint | 56/328 R |
| 2,924,284 | 2/1960 | Cykler et al. | 171/63 |
| 3,261,408 | 7/1966 | Simonar et al. | 171/63 |
| 4,040,489 | 8/1977 | Hulicsko | 171/63 |
| 4,221,265 | 9/1980 | Pratt | 171/63 P |
| 4,313,502 | 2/1982 | Nelson | 171/63 |

FOREIGN PATENT DOCUMENTS

| 1059772 | 8/1979 | Canada | 171/63 |
|---|---|---|---|
| 2237035 | 2/1974 | Fed. Rep. of Germany | 171/63 |

OTHER PUBLICATIONS

U.S.S.R. Author's Certificate 463 412 to Bareishis et al., Bulletin 10/15.3.75, 6/13/1975.

Primary Examiner—Richard T. Stouffer
Assistant Examiner—Terrence L. B. Brown
Attorney, Agent, or Firm—Stanley G. Ade

[57] ABSTRACT

A root picker includes a main frame supporting within it a triangular picker frame pivoted on the main frame at one apex with a lower and rearwardly positioned apex supporting a picker roller which is rotated to pick stones from the ground. A conveyor chain supporting transverse bars with outwardly extending teeth is pivotally mounted adjacent the third apex of the frame upwardly and rearwardly of the picker roller so that the chain turns around an axis at a position alongside the picker roller to lift rocks between the conveyor chain and the picker roller onto a surface which leads up to a bucket. The frame pivots to lift the conveyor chain and the picker roller away from the ground and also the conveyor chain is pivotal relative to the frame to increase the spacing between the chain and the picker roller. Rotating sweep drums are positioned forwardly and outwardly of the frame to pick and sweep rocks into the picker roller. The wheels can be lowered relative to the main frame to lift the main frame from the ground for transport.

5 Claims, 4 Drawing Figures

ROOT AND ROCK PICKER

BACKGROUND OF THE INVENTION

This invention relates to a root and rock picker of an improved construction.

Very many types of root picker have been developed over the years, each incorporating improvements or intended improvements relative to the prior arrangements. However, there is still scope for improved efficiency in terms of the effectiveness of the root picking operation, the convenience of delivery of the picked roots from the apparatus and also the resistance of the apparatus to wear and damage caused by engaging large rocks or uneven ground.

It will be appreciated that root picking apparatus of this type can be used for picking rocks or roots or other solid objects across the ground and the expression root picker is intended to cover all operations of this type.

SUMMARY OF THE INVENTION

It is one object of the present invention, therefore, to provide an improved root picker which operates in a more satisfactory manner than the prior art arrangements and is particularly and suitably designed for the purpose.

Accordingly, the invention provides a root picker comprising a main frame including ground wheels and forwarding means for supporting the main frame for movement in a transport direction across the ground to be picked, a picking roller having a plurality of teeth, means for rotating the picking roller about its axis for engaging roots to be picked, a picking frame supporting the picking roller with its axis transverse to the transport direction, means mounting the picking frame on the main frame for pivotal movement relative thereto about a horizontal axis spaced from the picking roller axis in the transport direction whereby the picking roller and frame can raise relative to the main frame, and lifting means having a plurality of teeth rotatable about a lifting means axis parallel to the picking roller axis and arranged to cooperate with the teeth of the picking roller to lift roots over the picking roller axis, said lifting means being mounted on the picking frame for movement therewith and for pivotal movement relative thereto about an axis parallel to the picking roller axis and spaced thereabove whereby the space between the picking roller axis and the lifting means axis can increase.

According to one feature of the invention the lifting means comprises a conveyor of the type where the teeth, after rotating around the axis, travel along a straight path to transport the picked rocks from the picking roller to a suitable container. Suitably, the container can be mounted rearwardly of the picking roller so that the lifting means lifts the rocks over the axis of the picking roller and then along a surface leading rearwardly and upwardly from the picking roller to the container.

In accordance with a particularly important aspect of the invention, the picking frame comprises a separate frame within the main frame which is triangular in side elevation. The picking frame can then be pivoted at one apex thereof forwardly of the picking roller and lifting means to allow the picking roller and lifting means to pivot away from the ground should they engage a particularly large rock or other elevated portion of the ground.

With the picking roller mounted at a second apex, the lifting means can be pivoted at the third apex which is then positioned upwardly and rearwardly relative to the picking roller so that the lifting means or conveyor can be pivoted away from the picking roller so that larger rocks or roots can pass between the teeth of the lifting conveyor and the picking roller for deposit onto the surface and transport by the conveyor.

To increase the width of operation of the root picker, a pair of toothed sweep rollers can be angled outwardly and forwardly from the ends of the picking roller to sweep picked roots inwardly toward the picking roller and for lifting into the container.

According to a yet further feature of the invention, the ground wheels can be each mounted upon a strut which can be pivoted relative to the main frame to raise the main frame, picking roller and lifting conveyor to allow transport thereof in a non-working position.

With the foregoing in view, and other advantages as will become apparent to those skilled in the art to which this invention relates as this specification proceeds, the invention is herein described by reference to the accompanying drawings forming a part hereof, which includes a description of the best mode known to the applicants and of the preferred typical embodiment of the principles of the present invention in which:

DESCRIPTION OF THE DRAWINGS

In the drawings like characters of reference indicate corresponding parts in the different figures.

DETAILED DESCRIPTION

The root picker comprises a main frame 10 including a hitch 11 and diverging support arms 12 whereby the main frame 10 can be drawn by a tractor across the ground in a transport direction for picking stones or other hard objects to be removed from the ground.

Figure 2:
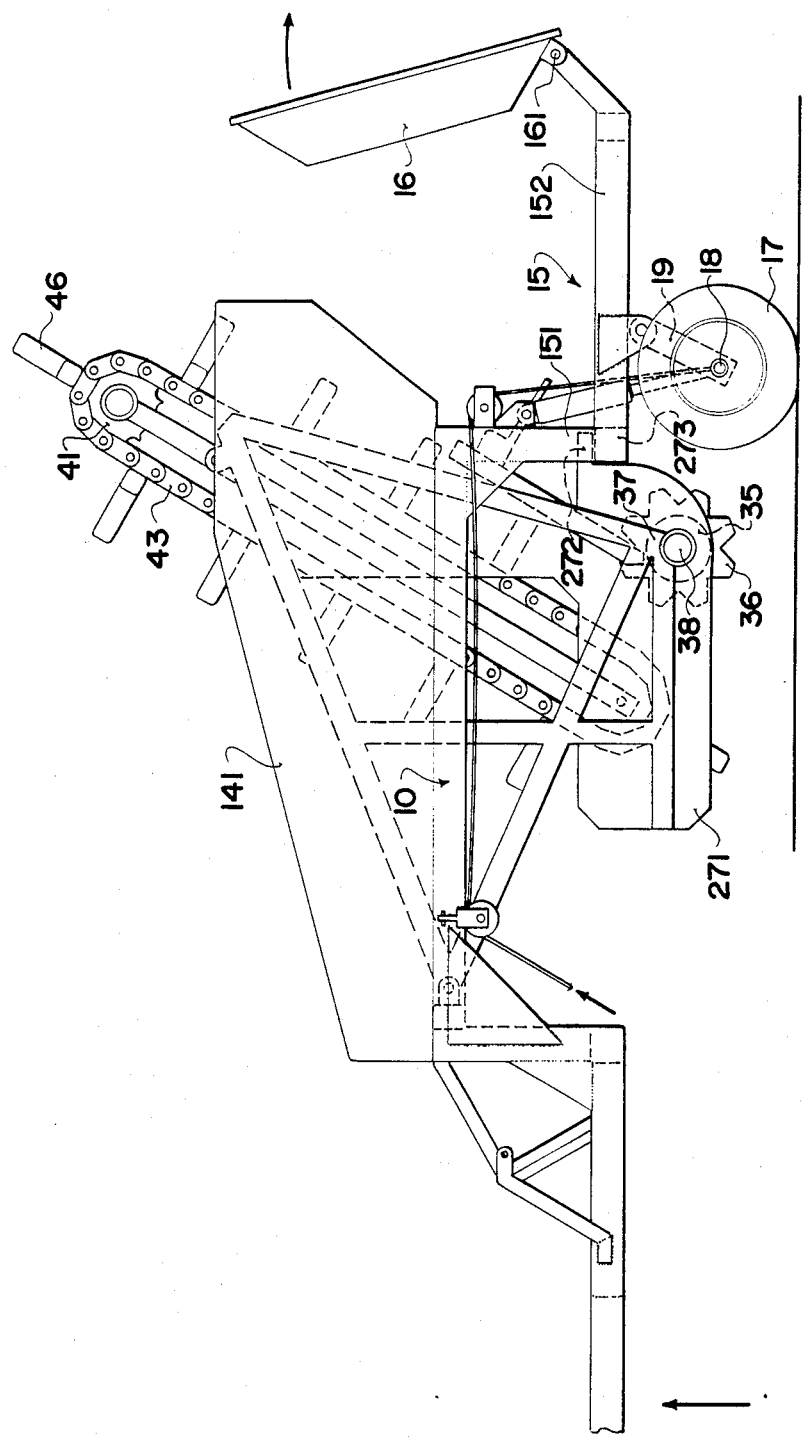
FIG. 2 is a side elevational view of the root picker of FIG. 1 in a transport position with the sweeps of FIG. 1 omitted for clarity.

The main frame 10 also includes a front transverse bar 13 and elongate side frame portions 14 which extend from the transverse bar 13 to wheel mounts 15 at the rear of the frame. The side frame members 14 as shown in FIG. 2, include upstanding side panels 141 which enclose and protect the interior equipment and provide convenient reservoirs for the hydraulic fluid required for the hydraulic motors.

The wheel supports 15 include downwardly depending support beams 151 and rearwardly extending supports 152 so as to accommodate a bucket 16 supported on the frame at a convenient height.

The bucket 16 is mounted pivotally on a coupling 161 attached to the rear end of the support 152 so that it can be tilted to deposit stones collected either into a pile or into a container or truck box for transportation to a remote location.

The wheel supports 15 carry ground wheels 17 on axles 18 with each ground wheel supported on a strut 19 pivotally coupled to the middle of the support 152. Thus, each ground wheel can be moved from the position illustrated in FIG. 3 which is a working position where the main frame is lowered toward the ground to a second position shown in FIG. 2 where the strut 19 is pivoted through 90° and hence stands at right angles to the main frame thus raising the main frame from the ground sufficiently to remove the working implements from the ground.

The strut 19 can then be locked in position in the raised condition to allow the frame to be transported without working the ground.

A pair of revolving sweep drums or rollers is provided with each drum being mounted on a respective side of the main frame and generally indicated at 20. Each drum is supported by a pair of castored ground wheels 21, 22, one mounted on the outer end of the drum and the other supporting the inner end. In addition, the inner end of the drum is attached to the main frame and is held at a desired angle to the main frame by a pair of chains 23, 24 so that the drum is inclined outwardly and forwardly at approximately 45° to the direction of movement. The drum includes a plurality of teeth (not shown) arranged around the exterior of the drum in a helical path with a stationary grid 25 in between the teeth to act as a rake.

Each drum is driven by a respective hydraulic motor 26 so that it rotates relative to the grid 25 and the ground to pick stones from the ground and to sweep them inwardly to a position inside the main frame. The effective working width of the apparatus is therefore approximately at the wheels 21 even though this is considerably wider than the main frame 14.

Figure 3:
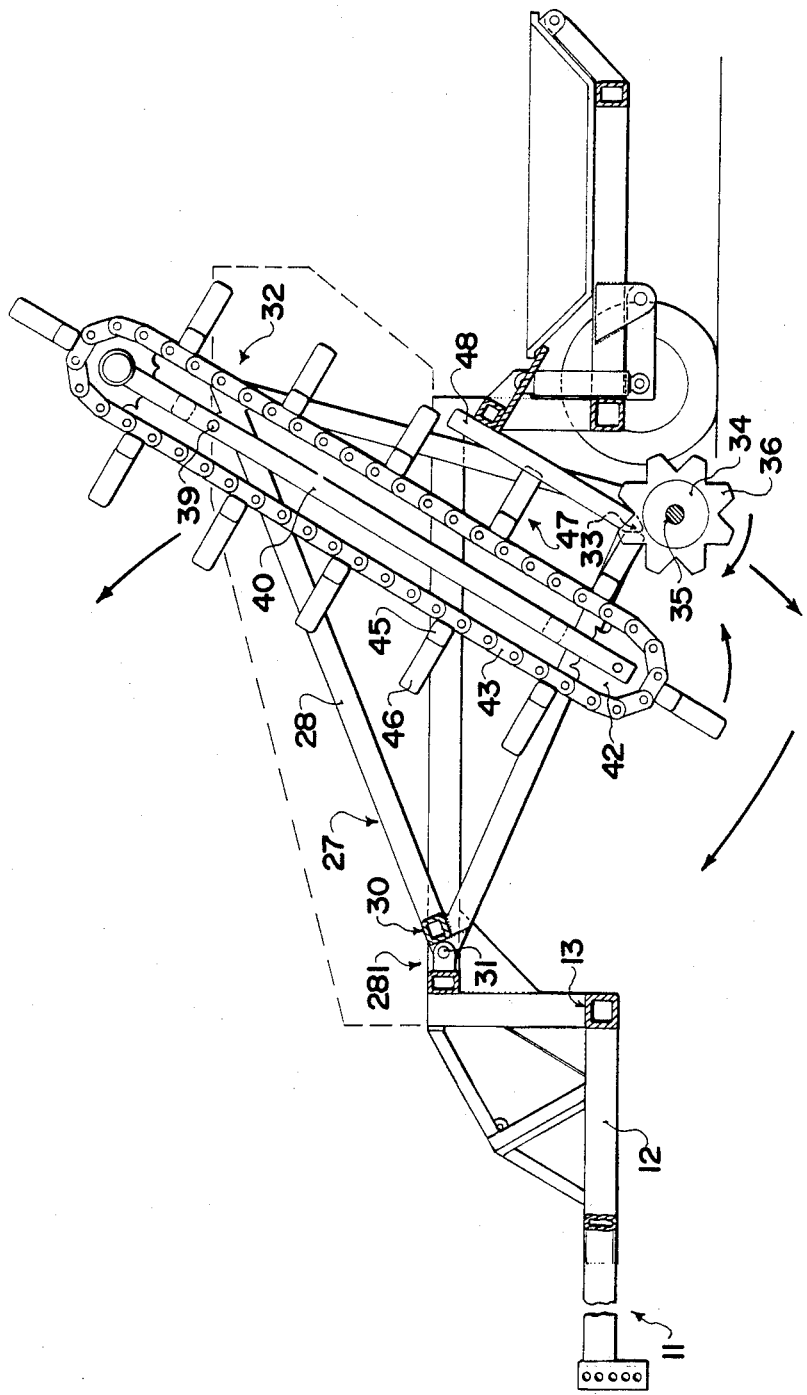
FIG. 3 is a side elevational view similar to FIG. 2 showing the root picker in working position.
Figure 4:
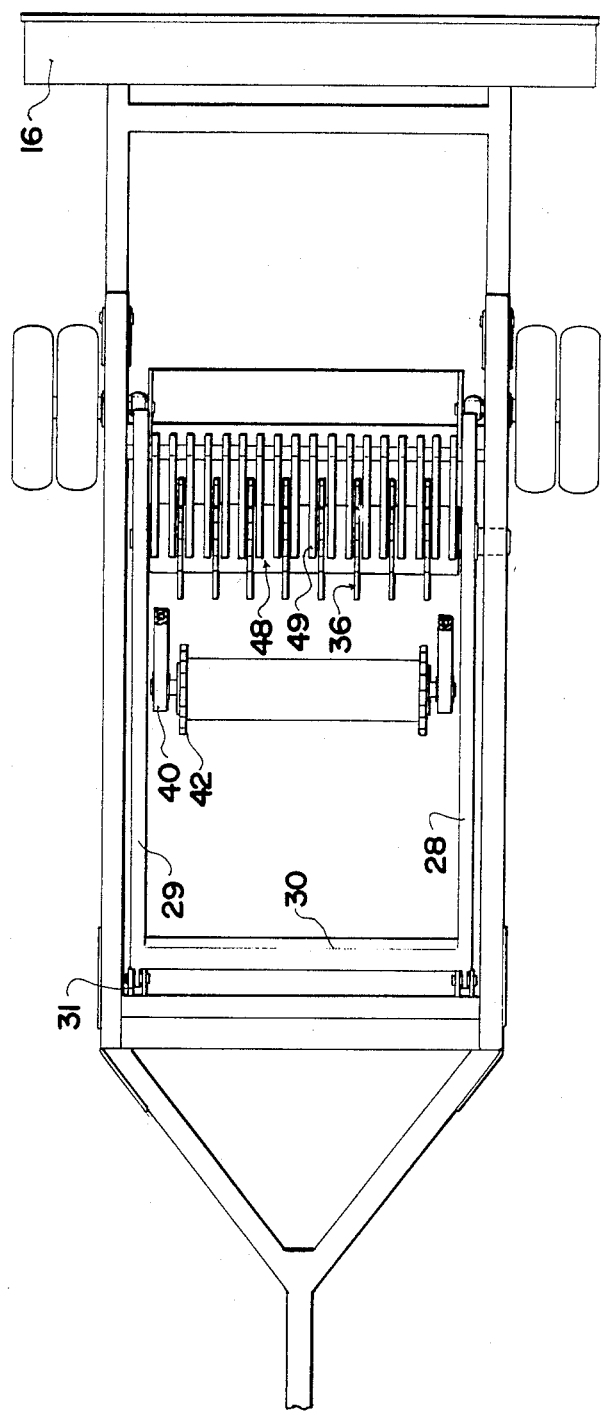
FIG. 4 is a plan view similar to FIG. 1 with the conveyor chain and teeth omitted to show the picker roller and grid.

Within the main frame and as shown in most detail in FIG. 3, there is provided a picker frame 27 formed from two triangular frame sections 28, 29 interconnected by transverse rods 30 which support the frame sections in spaced parallel relationship to form a rigid structural frame.

It will be noted from FIG. 3 that the frame member 28 is substantially triangular and has a forwardmost apex indicated at 281 which is pivotally connected to the main frame by a pivot pin 31. The pivot pins 31 on both sides of the main frame therefore provide a horizontal axis about which the picker frame 27 can pivot so as to raise and lower the position of the other apices indicated at 32, 33.

At or adjacent the lowermost apex 33 is positioned a picker roller 34 which is formed by a shaft 35 which carries a plurality of toothed discs 36, the discs lying in radial planes and the teeth extending over arcuate sections of the radial plane. The shaft is mounted on the frame 27 at the apex 32 with, for convenience of manufacture, a short extension portion 37 extending downwardly to receive the bearings 38 of the shaft 35.

It will be noted therefore that the picker roller 34 is positioned behind and beneath the pivot pins 31 so that as the frame 27 pivots about the pins 31, the roller 34 moves upwardly and downwardly along a curve thus raising and lowering the roller relative to the ground. In practice, the roller thus can jump if it engages a particular rigid portion of the ground or a very large stone.

Figure 1:
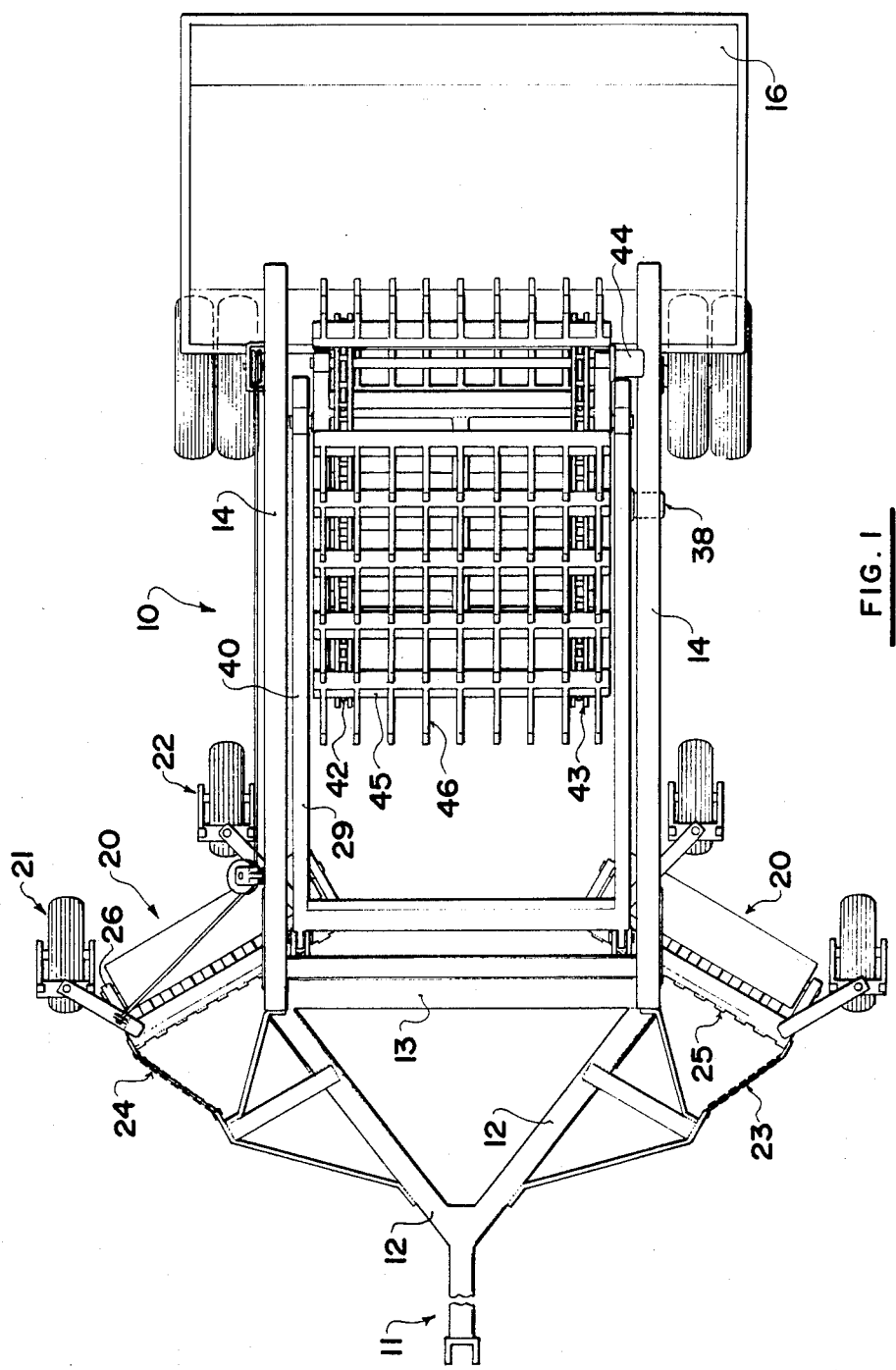
FIG. 1 is a top plan view of a root picker according to the invention.

At the third apex 33 is provided a pivot pin or shaft 39 on which is mounted a pair of support beams 40 (FIG. 1). Again for convenience of manufacture, the pivot pin 39 is slightly spaced from the apex 33 to avoid the coupling between the frame bars.

The support bars 40 extend downwardly from the shaft 39 and also upwardly therefrom by a shorter distance and each supports a pair of chain wheels 41, 42 carrying a chain 43 of heavy construction. The chain wheels 41, 42 can be driven by suitable hydraulic motors indicated at 44 to rotate the chain 43 in the form of a conveyor track.

The chains 43 support transverse bars 45 each of which in turn carries a plurality of teeth 46 which extend outwardly from the bar.

The lowermost chain wheels 42 thus guide the bars 45 around in a circle with the teeth pointing outwardly so as to engage the ground. After turning through the circle about the axis of the chain wheel 41, the teeth then move up the underside of the conveyor in the direction of the arrow 47.

It will be noted therefore that the frame 27 supports both the picker roller 34 and also the conveyor chain for upward and downward movement relative to the pivot pin 31 and at the same time the conveyor chain can pivot relative to the frame so as to increase the spacing between the conveyor chain and the picker roller 34.

Immediately above the picker roller 34 mounted on the frame 27 for movement therewith, is provided a conveyor surface 48 in the form of a plurality of spaced parallel slats 49 with the spacing between the slats parallel to the direction of motion of the teeth 46. The surface 48 is inclined upwardly and rearwardly from above the picker roller 34 to a position just above the entrance to the bucket 16. The slats 49, the teeth 36 of the picker roller and the teeth 46 of the conveyor chain are so arranged and spaced that the spaces between the slats 49 are aligned with alternate ones of the teeth 36, 46 and are maintained so by the rigid interconnection of the frame 27.

The frame 27 carries side plates 271 at either end of the frame outwardly of the picking roller 35. The plates each include a lug 272 at the rear end for resting on a transverse beam 273 of the main frame when the latter is in the raised transport position. The lugs 272 however ride above the beam 273 in the working position where the lower edge of the plate 271 is curved to allow it to avoid the beam 273.

In operation, the frame 27 is biased downwardly by its own weight or by a pressure device (not shown) for example, a hydraulic cylinder so as to engage the teeth 46 and the teeth 36 with the ground. The teeth 46, 36 of the conveyor and of the roller 34 are arranged as explained above so that they pass in between one another in this orientation so that the picker roller 34 acts to lift stones from the ground which are then carried by the teeth 36 and by the teeth 46 between the two bodies to a position above the axis of the roller 34. In this position, the rocks engage the surface 48 and are carried by cooperation between the teeth 46 and the slats 49 upwardly to the bucket 16. This position of the chain relative to the surface 48 is arranged such that the teeth in the normal operating condition project slightly in between the slats 49 to ensure that rocks are carried upwardly over the surface 48.

However, should a particularly large rock or root be encountered and picked by the teeth 36, the teeth 46 can move away from the teeth 36 by virtue of the pivotal movement of the support beams 40 about the pivot pins 39. Thus, the lower chain wheels 42 pivot in a clockwise direction around the pivot pins 39 to open up the space between the lower chain wheels 42 and the roller 34. As soon as the teeth have passed the large rock or other body between the two axes, the chain wheels 42 can again pivot downwardly to the normal working position.

Furthermore, should the teeth 46 and/or teeth 36 engage a particularly rigid or raised portion of ground, the whole frame 27 can pivot upwardly about the pivot pins 31 thus lifting both the teeth 46 and the teeth 36 away from damage.

This arrangement provides a particularly efficient picking method which also is very resistant to damage. The rocks are conveniently and accurately carried by the teeth 46 along the surface 48 to the bucket 16 for collection.

As shown, the bucket 16 is merely a low level support positioned wholly beneath the top end of the grid 48. Thus, rocks which are collected can drop from the relatively low height of the top of the grid onto the bucket without serious impact. However, the conveyor 41 extends to a height very much greater than the grid 48 or the bucket 16. This height is provided because the device is primarily designed for roots which have a low density or high volume relative to the weight. Thus, the conveyor 41 can create a large pile of roots on the bucket 16 with the roots being lifted beyond the grid 48 upwardly to the top of the pile by the conveyor teeth.

Since various modifications can be made in our invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A root picker comprising a main frame including ground wheels and hitch means for engaging a tractor for drawing the main frame on said ground wheels for movement in a transport direction across ground to be picked, a picking roller having a plurality of radially extending axially spaced teeth, means for rotating the picking roller about an axis for engaging roots to be picked, a picking frame which is triangular in side elevation, the picking roller being mounted on said frame at one apex thereof with the axis of rotation of the roller being transverse to the transport direction, means mounting the picking frame on the main frame for pivotal movement relative thereto about a horizontal axis at a second apex of the picking frame spaced from the picking roller axis forwardly and upwardly thereof whereby the picking roller and frame can raise relative to the main frame and whereby the weight of the picking roller and frame drive the picking roller teeth into the ground, lifting and conveying means comprising an endless conveyor drivable about a lower lifting means axis and an upper lifting means axis and having a plurality of radially extending axially spaced teeth drivable about said lifting means axes, said lower lifting means axis being arranged parallel to and forwardly of the picking roller axis such that the lifting means teeth engage and dig into the ground forwardly of the picking roller teeth and are axially offset from the picking roller teeth to pass therebetween and to cooperate with the picking roller teeth to lift roots over the picking roller axis, said lifting means being mounted on the picking frame at a third apex thereof for movement therewith and for pivotal movement relative thereto about an axis at said third apex parallel to the lower lifting means axis and spaced upwardly and rearwardly therefrom whereby the space between the picking roller axis and the lifting means axis can increase, an inclined conveyor surface formed by a plurality of slats parallel to a direction of motion of the roots and arranged such that the teeth of the picking roller and lifting means project in between the slats and a bucket for receiving said roots mounted on said main frame rearwardly of said conveyor surface.

2. The invention according to claim 1 including a pair of toothed sweep rollers mounted on the main frame so as to extend outwardly and forwardly from a position forward of the ends of the picking roller and means for rotating the sweep rollers to pick rocks outwardly of the picking roller and move them inwardly to the picking roller.

3. The invention according to claim 1 including means for lowering the ground wheels relative to the main frame whereby to raise the main frame, picking roller and lifting means for transport.

4. The invention according to claim 1 wherein each ground wheel is mounted upon a strut pivotally connected to the main frame and movable between a first position in which the strut lies parallel to the main frame and a second position in which the strut lies at right angles to the main frame whereby to raise the main frame, picking roller and lifting means for transport.

5. The invention according to claim 1 wherein said lifting and conveying means extends to a height higher from said inclined conveyor surface to create a pile of roots higher than a top end of the inclined surface.

* * * * *